(12) United States Patent
Chiueh et al.

(10) Patent No.: US 8,037,529 B1
(45) Date of Patent: Oct. 11, 2011

(54) BUFFER OVERFLOW VULNERABILITY DETECTION AND PATCH GENERATION SYSTEM AND METHOD

(75) Inventors: Tzi-cker Chiueh, Setauket, NY (US); Kent "E" Griffin, Santa Monica, CA (US)

(73) Assignee: Symantec Corporation, Mountian View, CA (US)

( * ) Notice: Subject to any disclaimer, the term of this patent is extended or adjusted under 35 U.S.C. 154(b) by 831 days.

(21) Appl. No.: 12/051,441

(22) Filed: Mar. 19, 2008

(51) Int. Cl.
*G06F 12/14* (2006.01)
*G06F 17/30* (2006.01)

(52) U.S. Cl. ............ 726/22; 726/25; 713/188; 713/189

(58) Field of Classification Search .................... 726/22, 726/25; 713/188, 189
See application file for complete search history.

(56) References Cited

U.S. PATENT DOCUMENTS

| | | | | |
|---|---|---|---|---|
| 2003/0182572 | A1* | 9/2003 | Cowan et al. | 713/200 |
| 2005/0144471 | A1* | 6/2005 | Shupak et al. | 713/193 |
| 2005/0229254 | A1* | 10/2005 | Singh et al. | 726/23 |
| 2006/0021054 | A1* | 1/2006 | Costa et al. | 726/25 |
| 2006/0156032 | A1* | 7/2006 | Panjwani | 713/191 |
| 2006/0195745 | A1* | 8/2006 | Keromytis et al. | 714/741 |
| 2006/0259974 | A1* | 11/2006 | Marinescu et al. | 726/25 |
| 2006/0277539 | A1* | 12/2006 | Amarasinghe et al. | 717/168 |
| 2009/0144827 | A1* | 6/2009 | Peinado et al. | 726/25 |
| 2009/0282393 | A1* | 11/2009 | Costa et al. | 717/132 |

OTHER PUBLICATIONS

"CPNI INFOSEC Advisory—045/07—Microsoft Security Advisory: Vulnerability in Windows Animated Cursor Handling (935423)", pp. 1-3 [online]. Retrieved on Mar. 19, 2008 from the Internet: <URL:http://archive.cert.uni-stuttgart.de/cpni/2007/03/msg00020.html>. No author provided.

Cui et al., "ShieldGen: Automatic Data Patch Generation for Unknown Vulnerabilities with Informed Probing", pp. 1-15 [online]. Retrieved on Mar. 19, 2008 from the Internet: <URL:http://research.microsoft.com/users/wdcui/papers/shieldgen-oakland07.pdf>.

Lhee et al., "Type-Assisted Dynamic Buffer Overflow Detection", pp. 1-9 [online]. Retrieved on Mar. 19, 2008 from the Internet: <URL:http://citeseer.ist.psu.edu/lhee02typeassisted.html>.

Liang et al., "Automatic Generation of Buffer Overflow Attack Signatures: An Approach Based on Program Behavior Models", pp. 1-10 [online]. Retrieved on Mar. 19, 2008 from the Internet: <URL:http://seclab.cs.sunysb.edu/seclab/pubs/papers/acsac05.pdf>.

(Continued)

*Primary Examiner* — Michael Pyzocha
(74) *Attorney, Agent, or Firm* — Gunnison, McKay & Hodgson, L.L.P.; Serge J. Hodgson

(57) ABSTRACT

A computer-implemented method includes identifying a buffer overflow vulnerability in a vulnerable program including identifying a victim buffer creation site that created a victim buffer and identifying a vulnerability site that overflowed the victim buffer. A patch is created for the vulnerable program to prevent the vulnerability site from overflowing a potential victim buffer created by the victim buffer creation site. In this manner, the information obtained in identifying the buffer overflow vulnerability is used to automatically derive a patch that accurately seals the vulnerability, greatly reduces the false positive and negative rate, while at the same time shortens the response time to new threats.

16 Claims, 9 Drawing Sheets

OTHER PUBLICATIONS

"MS06-078: Vulnerability in Windows Media Format could allow remote code execution", pp. 1-3 [online]. Retrieved on Mar. 19, 2008 from the Internet: <URL:http://support.microsoft.com/kb/923689>. No author provided.

"MS07-002: Vulnerabilities in Microsoft Excel could allow remote code execution", pp. 1-2 [online]. Retrieved on Mar. 19, 2008 from the Internet: <URL:http://support.microsoft.com/kb/927198>. No author provided.

"PASAN: Automatic Patch and Signature Generation for Buffer-Overflow Attacks", pp. 1-20 [online]. Retrieved on Mar. 19, 2008 from the Internet: <URL:http://www.ecsl.cs.sunysb.edu/tr/TR213.pdf>. No author provided.

Pickard, "Buffer Overflow Detection", Jun. 14, 2005, pp. 1-26 [online]. Retrieved on Mar. 19, 2008 from the Internet: <URL:http://www.seas.gwu.edu/~simhaweb/security/summer2005/Stuart2.ppt#258>.

Ruwase et al., "A Practical Dynamic Buffer Overflow Detector", pp. 1-11 [online]. Retrieved on Mar. 19, 2008 from the Internet: <URL:http://suif.stanford.edu/papers/tunji04.pdf>.

Sidiroglou et al., "Countering Network Worms Through Automatic Patch Generation", pp. 1-11 [online]. Retrieved on Mar. 19, 2008 from the Internet: <URL:http://www1.cs.columbia.edu/~anelos/Papers/2005/wormpatch.pdf>.

Smirnov et al., "DIRA: Automatic Detection, Identification, and Repair of Control-Hijacking Attacks", pp. 1-17 [online]. Retrieved on Mar. 19, 2008 from the Internet: <URL:http://www.isoc.org/isoc/conferences/ndss/05/proceedings/papers/dira.pdf>.

"Yahoo! Messenger YVerInfo.DLL ActiveX Control Multiple Buffer Overflow Weaknesses", pp. 1-5 [online]. Retrieved on Mar. 19, 2008 from the Internet: <URL:http://www.securityfocus.com/bid/25494>. No author provided.

* cited by examiner

600

BUFFER OVERFLOW VULNERABILITY DETECTION AND PATCH GENERATION SYSTEM AND METHOD

BACKGROUND

1. Field of the Invention

The present invention relates to computer system security. More particularly, the present invention relates to a system and method of detecting and patching buffer overflow vulnerabilities.

2. Description of the Related Art

Buffer overflow techniques have been used by malicious hackers and virus writers to attack computer systems. Buffers are data storage areas, which generally hold a predefined amount of finite data. A buffer overflow occurs when code attempts to store data into the buffer, where the data is larger than the size of the buffer. Buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions. Thus, by exploiting a buffer overflow, it is possible to inject malicious code, sometimes called shell code, into the execution flow.

SUMMARY OF THE INVENTION

In accordance with one embodiment, a computer-implemented method includes identifying a buffer overflow vulnerability in a vulnerable program including identifying a victim buffer creation site that created a victim buffer and identifying a vulnerability site that overflowed the victim buffer.

The computer-implemented method further includes creating a patch for the vulnerable program to prevent the vulnerability site from overflowing a potential victim buffer created by the victim buffer creation site. In this manner, the information obtained in identifying the buffer overflow vulnerability is used to automatically derive a patch that accurately seals the vulnerability, greatly reduces the false positive and negative rate, while at the same time shortens the response time to new threats.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

In accordance with one embodiment, a buffer overflow vulnerability detection and patch generation process 200 (FIG. 2) includes identifying a buffer overflow vulnerability in a vulnerable program in an IDENTIFY BUFFER OVERFLOW VULNERABILITY OPERATION 204. In one embodiment, identifying the buffer overflow vulnerability includes identifying a victim buffer creation site that created a victim buffer and identifying a vulnerability site that overflowed the victim buffer.

The buffer overflow vulnerability detection and patch generation process 200 (FIG. 2) further includes creating a patch for the vulnerable program to prevent the vulnerability site from overflowing a potential victim buffer created by the victim buffer creation site in a CREATE PATCH OPERATION 206. Thus, as set forth more fully below, in accordance with one embodiment, the information obtained in identifying the buffer overflow vulnerability is used to automatically derive a patch that accurately seals the vulnerability, greatly reduces the false positive and negative rate, while at the same time shortens the response time to new threats.

Figure 1:
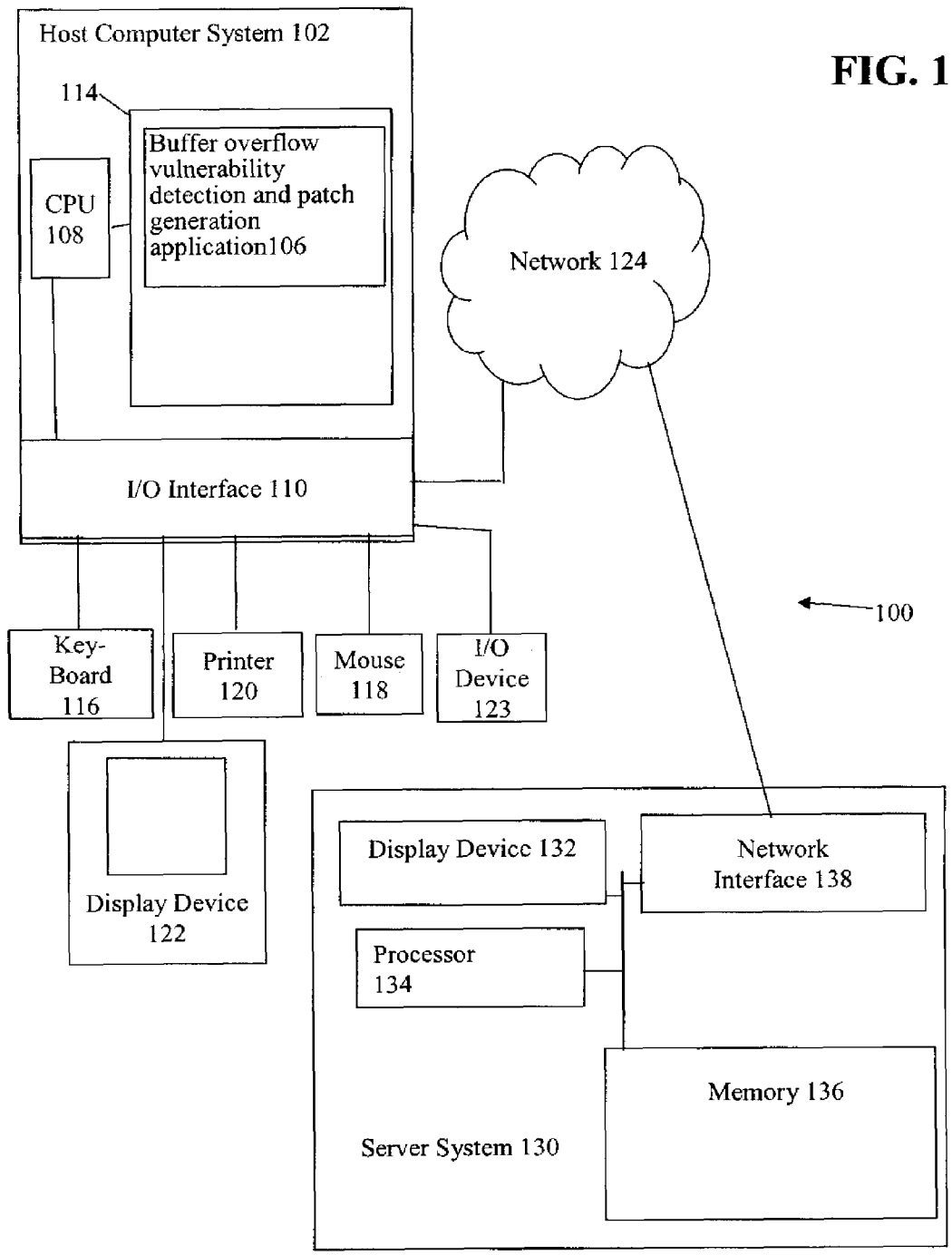
FIG. 1 is a diagram of a client-server system that includes a buffer overflow vulnerability detection and patch generation application executing on a host computer system in accordance with one embodiment.

More particularly, FIG. 1 is a diagram of a client-server system 100 that includes a buffer overflow vulnerability detection and patch generation application 106 executing on a host computer system 102 in accordance with one embodiment. Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, buffer overflow vulnerability detection and patch generation application 106 is loaded into host computer system 102 via I/O device 123, such as from a CD, DVD or floppy disk containing buffer overflow vulnerability detection and patch generation application 106.

In one embodiment, memory 114 includes a page based virtual memory system that uses pages, e.g., 4096 byte memory areas. More particularly, Windows® operating systems provide page-based virtual memory management schemes that permit programs to realize a virtual memory address space. When the computer system processor is running in virtual memory mode, all addresses are assumed to be virtual addresses and are translated, or mapped, to physical addresses in main memory each time the processor executes a new instruction to access memory.

Host computer system 102 is coupled to a server system 130 of client-server system 100 by a network 124. Server system 130 typically includes a display device 132, a processor 134, a memory 136, and a network interface 138. Server system 130 may further include standard devices like a keyboard, a mouse, a printer, and an I/O device(s). The various hardware components of server system 130 are not illustrated to avoid detracting from the principles of this embodiment.

Network 124 can be any network or network system that is of interest to a user. In various embodiments, network interface 138 and I/O interface 110 include analog modems, digital modems, or a network interface card.

Buffer overflow vulnerability detection and patch generation application 106 is stored in memory 114 of host computer system 102 and executed on host computer system 102. The particular type of and configuration of host computer system 102 and server system 130 are not essential to this embodiment.

Figure 2:
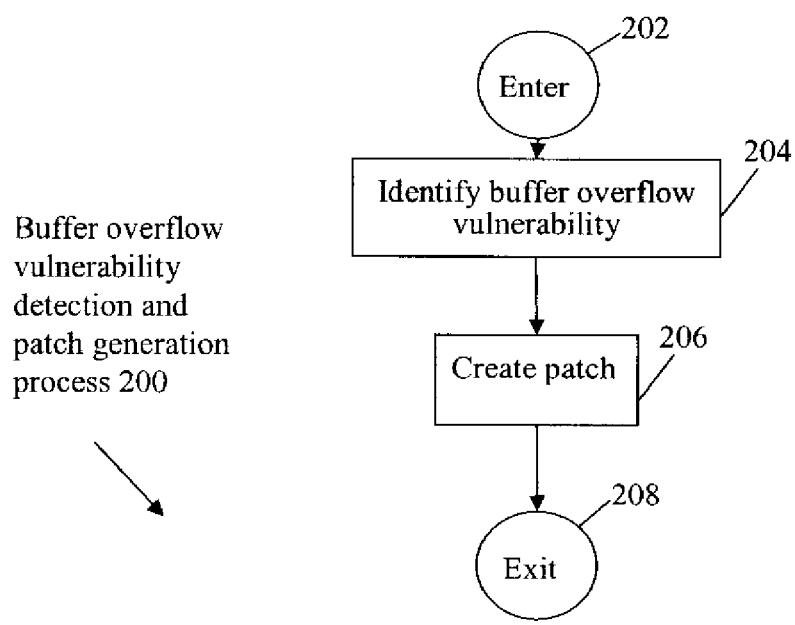
FIG. 2 is a flow diagram of a buffer overflow vulnerability detection and patch generation process in accordance with one embodiment.

FIG. 2 is a flow diagram of a buffer overflow vulnerability detection and patch generation process 200 in accordance with one embodiment. Referring now to FIGS. 1 and 2 together, execution of buffer overflow vulnerability detection and patch generation application 106 by processor 108 results in the operations of buffer overflow vulnerability detection and patch generation process 200 as described below in one embodiment.

From an ENTER OPERATION 202, flow moves to an IDENTIFY BUFFER OVERFLOW VULNERABILITY OPERATION 204. In IDENTIFY BUFFER OVERFLOW VULNERABILITY OPERATION 204, buffer overflow vulnerabilities of a vulnerable program of host computer system 102 are identified as set forth below in reference to FIGS. 3, 4, 5, and 6. Generally, a buffer overflow vulnerability is a vulnerability that can be exploited using a buffer overflow attack.

From IDENTIFY BUFFER OVERFLOW VULNERABILITY OPERATION 204, flow moves to a CREATE PATCH OPERATION 206. In CREATE PATCH OPERATION 206, a patch is created to seal the buffer overflow vulnerabilities identified in IDENTIFY BUFFER OVERFLOW VULNERABILITY OPERATION 204 as set forth below in reference to FIGS. 7, 8, 9, 10, 11, 12, 13, and 14. A patch is code designed to fix or update problems with a computer program.

From CREATE PATCH OPERATION 206, flow moves to and exits at an EXIT OPERATION 208.

Thus, in accordance with this embodiment, a first part (IDENTIFY BUFFER OVERFLOW VULNERABILITY OPERATION 204) includes an emulator or monitor that records relevant information about a vulnerable program as a buffer overflow is exploited and a second part (CREATE PATCH OPERATION 206) uses the recorded information to derive a corresponding patch that prevents the vulnerability from being exploited in the future as set forth further below. In one embodiment, the recorded information is gathered automatically from monitoring a buffer overflow exploit to create an effective patch for the vulnerability.

Figure 3:
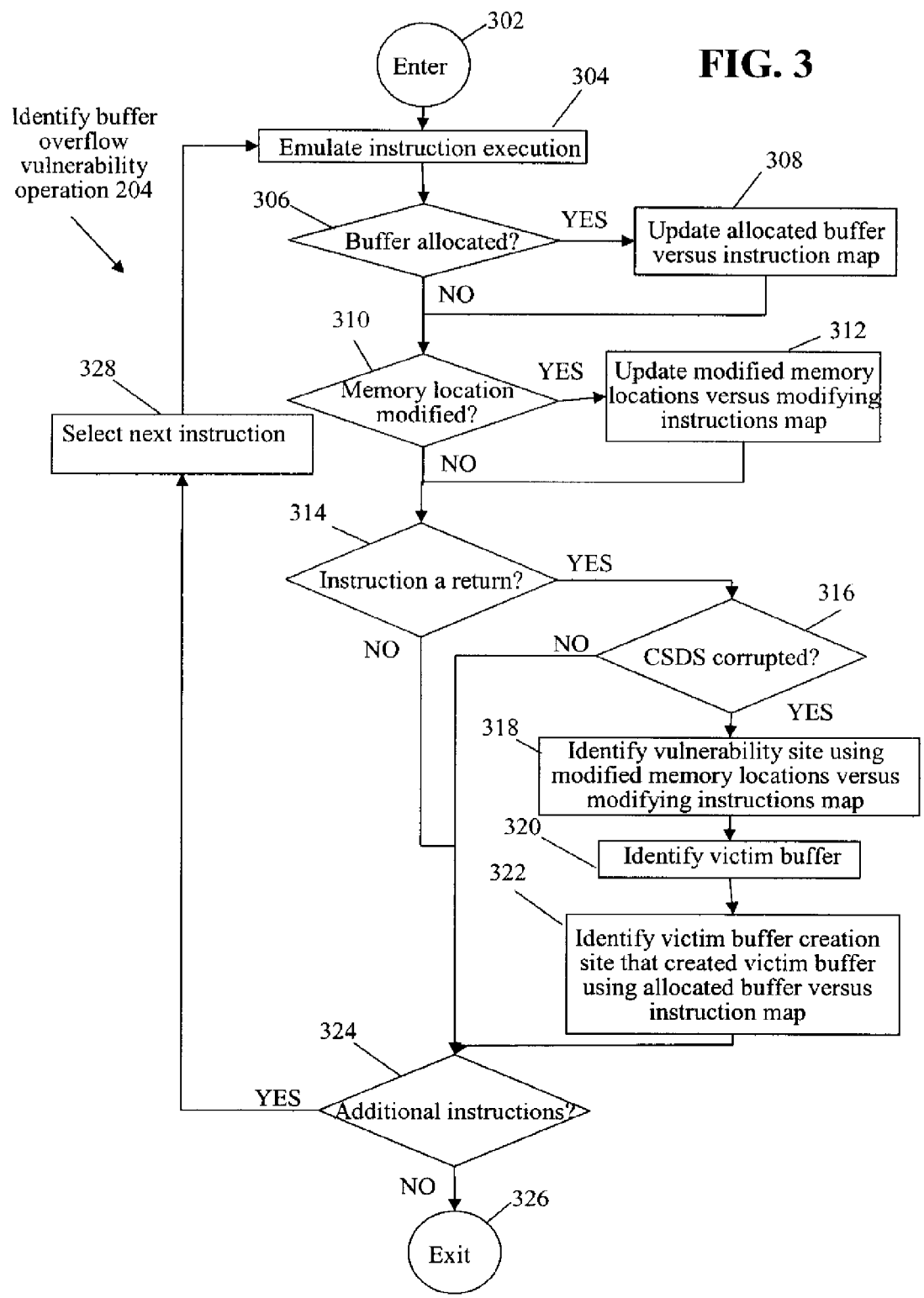
FIG. 3 is a flow diagram of an identify buffer overflow vulnerability operation of the buffer overflow vulnerability detection and patch generation process of FIG. 2 in accordance with one embodiment.

FIG. 3 is a flow diagram of IDENTIFY BUFFER OVERFLOW VULNERABILITY OPERATION 204 of buffer overflow vulnerability detection and patch generation process 200 of FIG. 2 in accordance with one embodiment. Referring now to FIG. 3, to identify a buffer overflow vulnerability, an exploit against the vulnerable program, sometimes called vulnerable binary, is run in an emulated or monitored environment. More particularly, to identify the vulnerability being exploited by an attack, the vulnerable program is run with an attack input until the vulnerable program encounters an access or other violation, which is an indication of attack. Such attack input is often available as a proof of concept for the vulnerability. Otherwise, a live exploit can be modified to achieve an access violation.

Accordingly, from an ENTER OPERATION 302, flow moves to an EMULATE INSTRUCTION EXECUTION OPERATION 304. In EMULATE INSTRUCTION EXECUTION OPERATION 304, an instruction of the vulnerable program is emulated, e.g., executed in a controlled environment such as a debugger, emulator or other environment where each executed instruction is examined and proper runtime information is logged. As a result of the emulation of the instruction, certain actions can occur such as those discussed below.

From EMULATE INSTRUCTION EXECUTION OPERATION 304, flow moves to a BUFFER ALLOCATED CHECK OPERATION 306. In BUFFER ALLOCATED CHECK OPERATION 306, a determination is made as to whether a buffer is allocated as result of the emulation of the instruction in EMULATE INSTRUCTION EXECUTION OPERATION 304. As is well known to those of skill in the art, a buffer is a data storage area, which generally holds a predefined amount of finite data. The term buffer is used generally and includes an array in one embodiment.

If a buffer is allocated, flow moves from BUFFER ALLOCATED CHECK OPERATION 306 to an UPDATE ALLOCATED BUFFER VERSUS INSTRUCTION MAP OPERATION 308. Conversely, if a buffer is not allocated, flow moves from BUFFER ALLOCATED CHECK OPERATION 306 directly to a MEMORY LOCATION MODIFIED CHECK OPERATION 310.

Accordingly, if a buffer is allocated, flow moves to UPDATE ALLOCATED BUFFER VERSUS INSTRUCTION MAP OPERATION 308. In UPDATE ALLOCATED BUFFER VERSUS INSTRUCTION MAP OPERATION 308, an allocated buffer versus instruction map is updated with the allocated buffer and the associated instruction that allocated the buffer at the victim buffer creation site. The allocated buffer versus instruction map allows a patch to be created even when the victim buffer creation site and the vulnerability site are in different functions as discussed further below.

Figure 4:
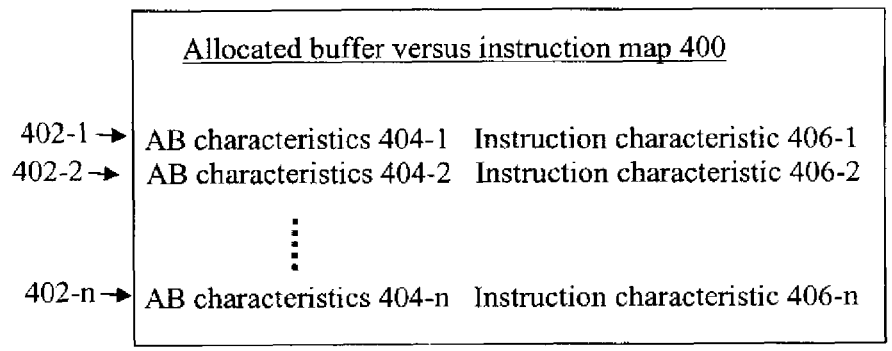
FIG. 4 is a block diagram of an allocated buffer versus instruction map in accordance with one embodiment.

FIG. 4 is a block diagram of an allocated buffer versus instruction map 400 in accordance with one embodiment. Referring now to FIGS. 3 and 4 together, allocated buffer versus instruction map 400 includes a plurality of entries 402-1, 402-2, . . . , 402n, collectively entries 402. Entries 402-1, 402-2, . . . , 402n, include allocated buffer (AB) characteristics 404-1, 404-2, . . . , 404n, collectively allocated buffer characteristics 404, and associated instruction characteristics 406-1, 406-2, . . . , 406n, collectively instruction characteristics 406, respectively.

To illustrate, entry 402-1 includes an allocated buffer characteristic 404-1 and associated instruction characteristic 406-1. Entry 402-1 associates the allocated buffer with the instruction that created the allocated buffer.

More particularly, allocated buffer characteristic 404-1 includes characteristics, i.e., at least one characteristic, that described the allocated buffer. For example, allocated buffer characteristic 404-1 includes the address range of the allocated buffer. Although one example of an allocated buffer characteristic is set forth, in light of this disclosure, those of skill in the art will understand that an allocated buffer can be described by any one of a number of characteristics depending on the particular application.

Further, instruction characteristic 406-1 includes characteristics, i.e., at least one characteristic, that described the instruction that created the allocated buffer described by allocated buffer characteristic 404-1. For example, instruction characteristic 406-1 includes the address of the instruction that created the allocated buffer described by allocated buffer characteristic 404-1. Although one example of an instruction characteristic is set forth, in light of this disclosure, those of skill in the art will understand that an instruction can be described by any one of a number of characteristics depending on the particular application.

Entries 402 includes allocated buffer characteristics 404 and associated instruction characteristics 406 in a similar manner to that described above regarding entry 402-1 and so are not described further to avoid detracting from the principles of this embodiment.

Accordingly, in UPDATE ALLOCATED BUFFER VERSUS INSTRUCTION MAP OPERATION 308, an entry 402 is added to allocated buffer versus instruction map 400 to associate the allocated buffer with the instruction that created the allocated buffer.

From UPDATE ALLOCATED BUFFER VERSUS INSTRUCTION MAP OPERATION 308, flow moves to MEMORY LOCATION MODIFIED CHECK OPERATION 310. In MEMORY LOCATION MODIFIED CHECK OPERATION 310, a determination is made as to whether a memory location has been modified by the emulated instruction.

If a memory location has been modified, flow moves from MEMORY LOCATION MODIFIED CHECK OPERATION 310 to an UPDATE MODIFIED MEMORY LOCATIONS VERSUS MODIFYING INSTRUCTIONS MAP OPERATION 312. Conversely, if a determination is made that a memory location has not been modified, flow moves from a MEMORY LOCATION MODIFIED CHECK OPERATION 310 to an INSTRUCTION A RETURN CHECK OPERATION 314.

Accordingly, if a memory location has been modified, flow moves to UPDATE MODIFIED MEMORY LOCATIONS VERSUS MODIFYING INSTRUCTIONS MAP OPERATION 312. In UPDATE MODIFIED MEMORY LOCATIONS VERSUS MODIFYING INSTRUCTIONS MAP OPERATION 312, a modified memory locations versus modifying instructions map is updated.

Figure 5:
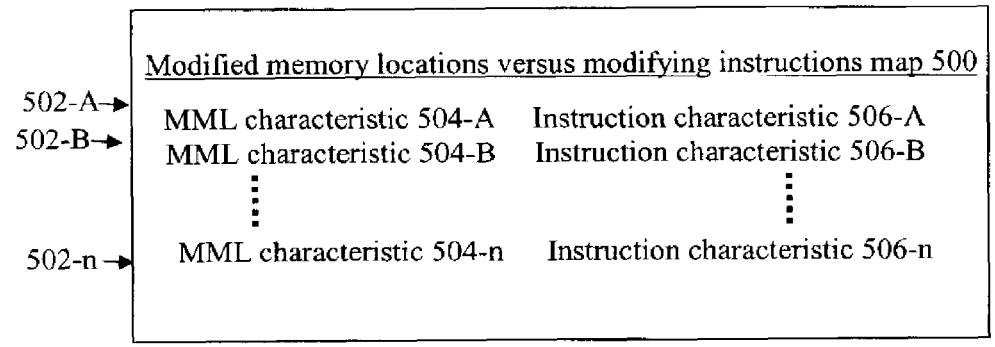
FIG. 5 is a block diagram of a modified memory locations versus modifying instructions map in accordance with one embodiment.

FIG. 5 is a block diagram of a modified memory locations versus modifying instructions map 500 in accordance with one embodiment. Referring now to FIGS. 3 and 5 together, modified memory locations versus modifying instructions map 500 includes records of which instructions modified which memory locations, in the order that the instructions are executed. More particularly, modified memory locations versus modifying instructions map 500 includes a plurality of entries 502-A, 502-B, . . . , 502n, collectively entries 502, sometimes called records. Entries 502-A, 502-B, . . . , 502n include modified memory location (MML) characteristics 504-A, 504-B, . . . , 504-n, collectively modified memory location characteristics 504, and associated instruction characteristics 506-A, 506-B, . . . , 506n, collectively instruction characteristics 506, respectively.

To illustrate, entry 502-A includes a modified memory location characteristic 504-A and associated instruction characteristic 506-A. Entry 502-A associates the modified memory location with the instruction that modified the memory location.

More particularly, modified memory location characteristic 504-A includes characteristics, i.e., at least one characteristic, that described the modified memory location. For example, modified memory location characteristic 504-A includes the address range of the modified memory location. Although one example of a modified memory location characteristic is set forth, in light of this disclosure, those of skill in the art will understand that a modified memory location can be described by any one of a number of characteristics depending on the particular application.

Further, instruction characteristic 506-A includes characteristics, i.e., at least one characteristic, that described the instruction that modified the memory location described by modified memory location characteristic 504-A. For example, instruction characteristic 506-A includes the address of the instruction that modified the memory location described by modified memory location characteristic 504-A. Although one example of an instruction characteristic is set forth, in light of this disclosure, those of skill in the art will understand that an instruction can be described by any one of a number of characteristics depending on the particular application.

Entries 502 includes modified memory location characteristics 504 and associated instruction characteristics 506 in a similar manner to that described above regarding entry 502-A and so are not described further to avoid detracting from the principles of this embodiment.

Accordingly, in UPDATE MODIFIED MEMORY LOCATIONS VERSUS MODIFYING INSTRUCTIONS MAP OPERATION 312, an entry 502 is added to modified memory locations versus modifying instructions map 500 to associate the modified memory location with the instruction that modified the memory location.

From UPDATE MODIFIED MEMORY LOCATIONS VERSUS MODIFYING INSTRUCTIONS MAP OPERATION 312, flow moves to INSTRUCTION A RETURN CHECK OPERATION 314. In INSTRUCTION A RETURN CHECK OPERATION 314, a determination is made as to whether the emulated instruction is a return instruction.

If the emulated instruction is a return instruction, flow moves to a CSDS CORRUPTED CHECK OPERATION 316. Conversely, if the emulated instruction is not a return instruction, flow moves directly to an ADDITIONAL INSTRUCTIONS CHECK OPERATION 324.

Accordingly, if the emulated instruction is a return instruction, flow moves to CSDS CORRUPTED CHECK OPERATION 316. In CSDS CORRUPTED CHECK OPERATION 316, a determination is made as to whether a control sensitive data structure (CSDS) such as a return address has been corrupted. If a CSDS has been corrupted, flow moves from CSDS CORRUPTED CHECK OPERATION 316 to an IDENTIFY VULNERABILITY SITE USING MODIFIED MEMORY LOCATIONS VERSUS MODIFYING INSTRUCTIONS MAP OPERATION 318. Conversely, if a CSDS has not been corrupted, flow moves from CSDS CORRUPTED CHECK OPERATION 316 to ADDITIONAL INSTRUCTIONS CHECK OPERATION 324.

Accordingly, if a CSDS has been corrupted, flow moves to IDENTIFY VULNERABILITY SITE USING MODIFIED MEMORY LOCATIONS VERSUS MODIFYING INSTRUCTIONS MAP OPERATION 318. In IDENTIFY VULNERABILITY SITE USING MODIFIED MEMORY LOCATIONS VERSUS MODIFYING INSTRUCTIONS MAP OPERATION 318, the emulated instruction, or set of instructions, that caused the CSDS to become corrupted is identified as the vulnerability site. In one embodiment, the vulnerability site is the instruction or set of instructions that overflowed a victim buffer causing a CSDS in an adjacent modified buffer to be corrupted, i.e., overwritten due to a buffer overflow. The vulnerability site is sometimes referred to as the binary instructions used to overflow a vulnerable buffer.

The vulnerability site is identify using the modified memory locations versus modifying instructions map. More particularly, the CSDS memory location of the corrupted CSDS is known. The CSDS memory location is used as a key in the modified memory locations versus modifying instructions map to determine the instruction, or set of instructions, which most recently modified the CSDS memory location thus corrupting the CSDS. The instruction, or set of instructions, is defined as the vulnerability site.

Figure 6:
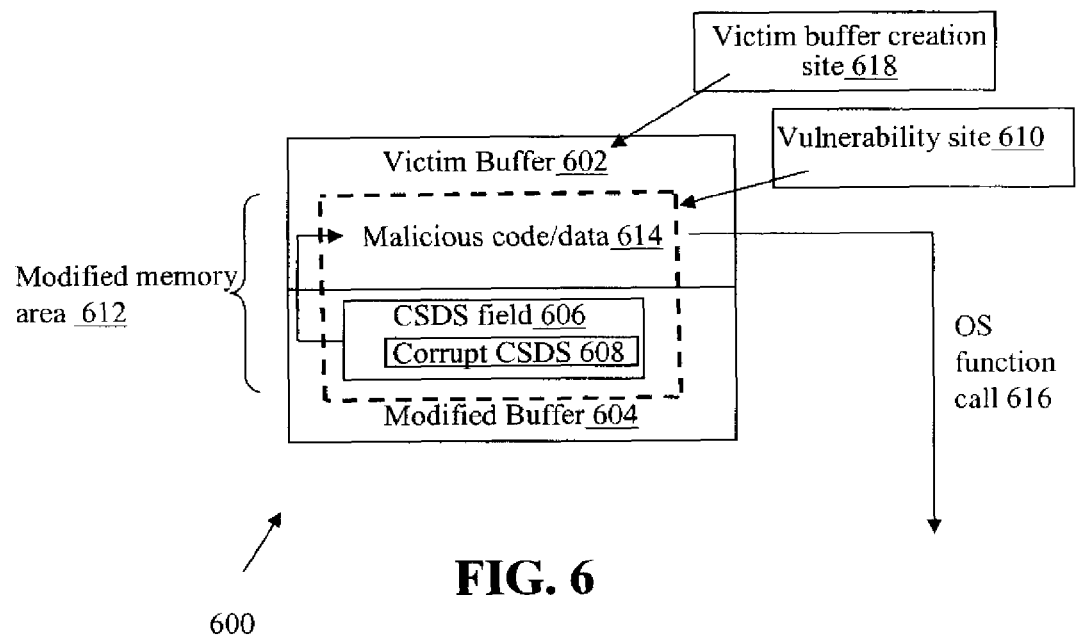
FIG. 6 is a block diagram of a memory structure in accordance with one embodiment.

For purposes of illustration, a buffer overflow vulnerability is described below in reference to FIG. 6, although it is to be understood that FIG. 6 is but one example, and that other buffer overflow vulnerabilities can be identified and associated patches created in accordance with other embodiments. As is well known, buffer overflow exploits typically work by overwriting a control sensitive data structure (CSDS) such as a return address with data derived from the input. By changing the input, the attacker is able to modify a CSDS to point to an address useful to the attacker, e.g., an instruction injected by the attacker.

FIG. 6 is a block diagram of a memory structure 600 in accordance with one embodiment. Memory structures 600 includes a victim buffer 602 and an adjacent modified buffer 604. The modified buffer 604 includes a CSDS field 606, i.e., a memory area in modified buffer 604. CSDS field 606 includes a corrupt CSDS 608, i.e., a value, sometimes called attribute, within CSDS field 606.

Referring now to FIGS. 3 and 6 together, in CSDS CORRUPTED CHECK OPERATION 316, a determination is made that CSDS field 606 includes corrupt CSDS 608. Illustratively, prior to being corrupted by the vulnerability site, CSDS field 606 included a valid CSDS that was overwritten with corrupt CSDS 608 due to a buffer overflow attack. As the value within CSDS field 606 has changed, i.e., from a valid CSDS to corrupt CSDS 608, a determination is made that the CSDS is corrupted in CSDS CORRUPTED CHECK OPERATION 316. Accordingly, flow moves to IDENTIFY VULNERABILITY SITE USING MODIFIED MEMORY LOCATIONS VERSUS MODIFYING INSTRUCTIONS MAP OPERATION 318.

More particularly, vulnerability site 610 has modified (written to) modified memory area 612. As a simple example, vulnerability site 610 includes the following instructions: (1) write to target memory address (TMA); and (2) TMA equals TMA+4. Vulnerability site 610 includes a loop that continuously writes to and increments the target memory address.

Modified memory area 612 begins with victim buffer 602 and extends into modified buffer 604. Illustratively, vulnerability site 610 initially writes to a target memory address within victim buffer 602, increments the target memory address, writes to the incremented target memory address, and so forth until CSDS field 606 is overwritten with corrupt CSDS 608. At the same time, vulnerability site 610 writes, sometimes called injects, malicious code/data 614 into victim buffer 602 and corrupt CEDE 608.

Corrupted CSDS 608 contains an address pointing to the injected malicious code/data 614. Accordingly, upon execution of a return instruction using corrupted CSDS 608, the program's control flow would be transferred to the injected malicious code/data 614 instead of to the valid return site causing execution of malicious code/data 614. In one example, execution of malicious code/data 614 invokes an operating system (OS) function call 616 to open a remote shell as those of skill in the art will understand.

Accordingly flow moves to IDENTIFY VULNERABILITY SITE USING MODIFIED MEMORY LOCATIONS VERSUS MODIFYING INSTRUCTIONS MAP OPERATION 318. In IDENTIFY VULNERABILITY SITE USING MODIFIED MEMORY LOCATIONS VERSUS MODIFYING INSTRUCTIONS MAP OPERATION 318, the modified memory locations versus modifying instructions map is used to identify vulnerability site 610. To illustrate, referring now to FIGS. 3, 5 and 6 together, assume the case where CSDS field 606 within modified memory area 612 is an address within an address range described by modified memory location characteristic 504-B in modified memory locations versus modifying instructions map 500. Accordingly, the respective instruction described by instruction characteristic 506-B is the instruction that modified CSDS field 606 with corrupt CSDS 608. In accordance with this illustration, the instruction is identified as vulnerability site 610.

From IDENTIFY VULNERABILITY SITE USING MODIFIED MEMORY LOCATIONS VERSUS MODIFYING INSTRUCTIONS MAP OPERATION 318, flow moves to an IDENTIFY VICTIM BUFFER OPERATION 320. In IDENTIFY VICTIM BUFFER OPERATION 320, the victim buffer is identified. In one embodiment, the buffer that is being overflowed is defined as the victim buffer, and is identified by consulting the modified memory locations versus modifying instructions map to locate the first memory location that the previous instances of the vulnerability site modify and overflow.

In one embodiment, the address of the corrupt CSDS serves as an upper (lower) bound for the victim buffer if the traversal through the victim buffer is in an increasing (decreasing) order. Neighboring memory location accesses are analyzed to determine the exact size of the victim buffer in one embodiment.

Accordingly, returning to the illustration above, the previous instances of vulnerability site 610 are examined to identify victim buffer 602.

From IDENTIFY VICTIM BUFFER OPERATION 320, flow moves to an IDENTIFY VICTIM BUFFER CREATION SITE THAT CREATED VICTIM BUFFER USING ALLOCATED BUFFER VERSUS INSTRUCTION MAP OPERATION 322. In IDENTIFY VICTIM BUFFER CREATION SITE THAT CREATED VICTIM BUFFER USING ALLOCATED BUFFER VERSUS INSTRUCTION MAP OPERATION 322, the allocated buffer versus instruction map is used to identify the victim buffer creation site that created the victim buffer. The victim buffer creation site is the instruction, or set of instructions, that created, sometimes called allocated, the victim buffer. The victim buffer creation site is sometimes referred to as the binary instructions that create the victim buffer. Further, the victim buffer is sometimes referred to as the vulnerable buffer.

Accordingly, returning to the illustration above and referring now to FIGS. 3, 4 and 6 together, assume the case where victim buffer 602 is the same as the allocated buffer described by allocated buffer characteristic 404-2 in allocated buffer versus instruction map 400. Accordingly, the respective instruction described by instruction characteristic 406-2 is the instruction that allocated victim buffer 602. In accordance with this illustration, the instruction is identified as victim buffer creation site 618.

Referring again to FIG. 3, from (1) IDENTIFY VICTIM BUFFER CREATION SITE THAT CREATED VICTIM BUFFER USING ALLOCATED BUFFER VERSUS INSTRUCTION MAP OPERATION 322; (2) from a negative determination (NO) in INSTRUCTION A RETURN CHECK OPERATION 314; or (3) from a negative determination (NO) in CSDS CORRUPTED CHECK OPERATION 316, flow moves to ADDITIONAL INSTRUCTIONS CHECK OPERATION 324. In ADDITIONAL INSTRUCTIONS CHECK OPERATION 324, a determination is made as to whether there are additional instructions that have not been emulated.

If there are no additional instructions, i.e., the vulnerable program has entirely been emulated, flow moves to and exits at an EXIT OPERATION 326. Conversely, if there is at least one additional instruction that has not been emulated, flow moves from ADDITIONAL INSTRUCTIONS CHECK OPERATION 324 to a SELECT NEXT INSTRUCTION OPERATION 328.

In SELECT NEXT INSTRUCTION OPERATION 328, the next instruction of the vulnerable program being emulated is selected for emulation. Flow moves from SELECT NEXT INSTRUCTION OPERATION 328 to EMULATE INSTRUCTION EXECUTION OPERATION 304, where the selected instruction is emulated as set forth above. OPERATIONS 304-328 are repeated until a determination is made in ADDITIONAL INSTRUCTIONS CHECK OPERATION 324 that there are no additional instructions to be emulated, and flow exits at EXIT OPERATION 326.

In the above manner, the buffer overflow vulnerability in the vulnerable program that is exploited by the attack and the victim buffer being overflowed in the attack are identified. Moreover, the victim buffer creation site for the victim buffer is also identified.

In one embodiment, buffer overflow vulnerability detection and patch generation application 106 includes two components. The first component performs IDENTIFY BUFFER OVERFLOW VULNERABILITY OPERATION 204 as set forth above and automatically gathers information about a buffer overflow vulnerability by running an exploit against the vulnerable program (sometimes called vulnerable binary) in an emulated or monitored environment. From this, the attack is detected and the victim buffer creation site, the vulnerable buffer address range, and the vulnerability site are all determined.

As set forth below, the second component performs CREATE PATCH OPERATION 206 using the information from the first component. This patch detects any exploit of the identified vulnerability using two data structures as discussed below: (1) the potential victim buffer address map; and (2) the progress map. Both the potential victim buffer address map and the progress map are allocated on a per-thread basis. Thus, threads in a multi-threading application will not interfere with one another with respect to accessing these two maps.

Figure 7:
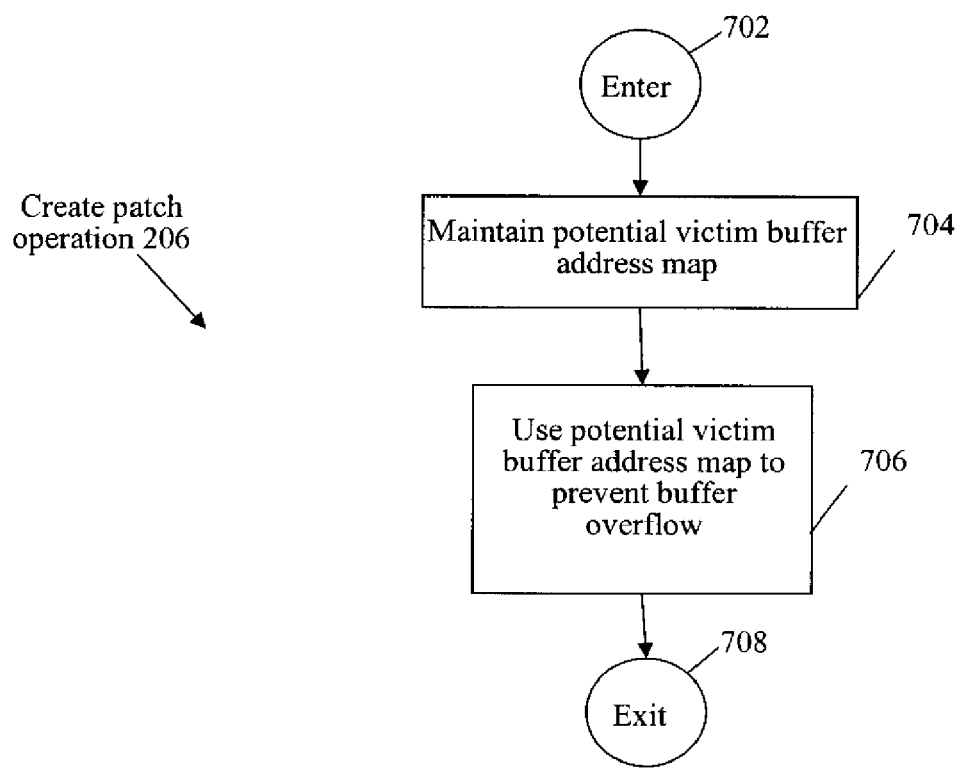
FIG. 7 is a flow diagram of a create patch operation of the buffer overflow vulnerability detection and patch generation process of FIG. 2 in accordance with one embodiment.

FIG. 7 is a flow diagram of CREATE PATCH OPERATION 206 of buffer overflow vulnerability detection and patch generation process 200 of FIG. 2 in accordance with one embodiment. The patch can be either statically applied to the vulnerable program or can be dynamically inserted as the vulnerable program is loaded using any dynamic function interception technique. In one embodiment, the point in the vulnerable program at which the patch is applied is right before the instruction that overflows the victim buffer in a buffer overflow attack, but right after the registers needed to generate the destination address of the overflowing instruction have been set. Typically, the patch consists of a jmp instruction replacing the overflowing instruction, and a set of checks located in the jmp's target that determines if executing the overflowing instructions might lead to a buffer overflow or not.

More particularly, referring now to FIG. 7, from an ENTER OPERATION 702, flow moves to a MAINTAIN POTENTIAL VICTIM BUFFER ADDRESS MAP OPERATION 704. In MAINTAIN POTENTIAL VICTIM BUFFER ADDRESS MAP OPERATION 704, a new entry is inserted into the potential victim buffer address map at each victim buffer creation site. The potential victim buffer address map holds the address range information about potentially vulnerable buffers, sometimes called potential victim buffers.

A potential victim buffer is a buffer that has the potential to be a victim buffer, i.e., has the potential to be overflowed by a vulnerability site. In one embodiment, any buffer created by a victim buffer creation site, i.e., a site that has been identified to create victim buffers as set forth above, is a potential victim buffer.

From MAINTAIN POTENTIAL VICTIM BUFFER ADDRESS MAP OPERATION 704, flow moves to a USE POTENTIAL VICTIM BUFFER ADDRESS MAP TO PREVENT BUFFER OVERFLOW OPERATION 706. In USE POTENTIAL VICTIM BUFFER ADDRESS MAP TO PREVENT BUFFER OVERFLOW OPERATION 706, the potential victim buffer address map created in MAINTAIN POTENTIAL VICTIM BUFFER ADDRESS MAP OPERATION 704 is used to derive a patch that can prevent the exploited buffer overflow vulnerability from being exploited again. From USE POTENTIAL VICTIM BUFFER ADDRESS MAP TO PREVENT BUFFER OVERFLOW OPERATION 706, flow moves to and exits at an EXIT OPERATION 708.

Figure 8:
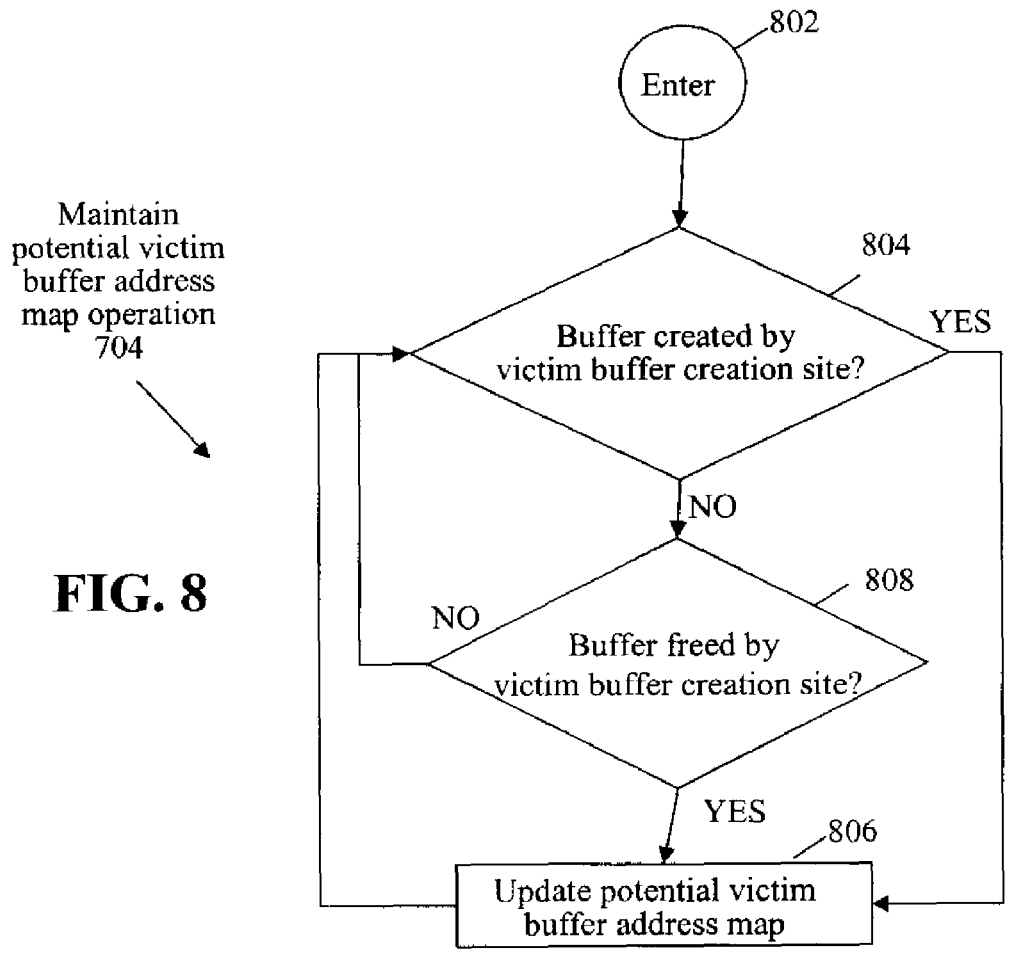
FIG. 8 is a flow diagram of a maintain potential victim buffer address map operation of the create patch operation of FIG. 7 in accordance with one embodiment.

FIG. 8 is a flow diagram of MAINTAIN POTENTIAL VICTIM BUFFER ADDRESS MAP OPERATION 704 of CREATE PATCH OPERATION 206 of FIG. 7 in accordance with one embodiment. Referring now to FIG. 8, from an ENTER OPERATION 802, flow moves to a BUFFER CREATED BY VICTIM BUFFER CREATION SITE CHECK OPERATION 804. In BUFFER CREATED BY VICTIM BUFFER CREATION SITE CHECK OPERATION 804, a determination is made as to whether a buffer has been created by a victim buffer creation site.

As set forth above, victim buffer creation sites are identify in IDENTIFY BUFFER OVERFLOW VULNERABILITY OPERATION 204. Accordingly, buffers that are created by these victim buffer creation sites are monitored using the potential victim buffer address map.

If a buffer has been created by a victim buffer creation site, flow moves to an UPDATE POTENTIAL VICTIM BUFFER ADDRESS MAP OPERATION 806. In UPDATE POTENTIAL VICTIM BUFFER ADDRESS MAP OPERATION 806, a new entry holding the address range information for the created buffer is inserted into the potential victim buffer address map. Illustratively, the address range of the created potential victim buffer is added as an entry to the potential victim buffer address map.

Figure 9:
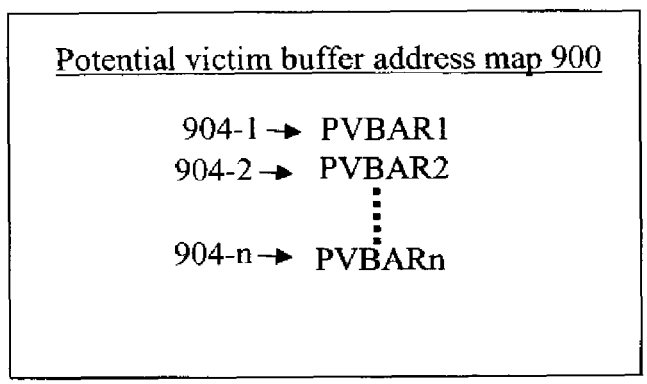
FIG. 9 is a block diagram of a potential victim buffer address map in accordance with one embodiment.

FIG. 9 is a block diagram of potential victim buffer address map 900 in accordance with one embodiment. Referring now to FIGS. 8 and 9 together, potential victim buffer address map 900 contains potential victim buffer address range information (characteristics) 904-1, 904-2, . . . , 904n, collectively potential victim buffer characteristics 904.

To illustrate, potential victim buffer characteristic 904-1 includes characteristics, i.e., at least one characteristic, that described the potential victim buffer created. For example, potential victim buffer characteristic 904-1 includes the potential victim buffer address range 1 (PVBAR1) of the first potential victim buffer. Although one example of a potential victim buffer characteristic is set forth, in light of this disclosure, those of skill in the art will understand that a potential victim buffer can be described by any one of a number of characteristics depending on the particular application.

Potential victim buffer characteristics 904 are similar to potential victim buffer characteristic 904-1 and so are not described further to avoid detracting from the principles of this embodiment.

Accordingly, in UPDATE POTENTIAL VICTIM BUFFER ADDRESS MAP OPERATION 806, a potential victim buffer characteristic 904 is added to potential victim buffer address map 900 to track the potential victim buffer created by the victim buffer creation site.

From UPDATE POTENTIAL VICTIM BUFFER ADDRESS MAP OPERATION 806, flow returns to BUFFER CREATED BY VICTIM BUFFER CREATION SITE CHECK OPERATION 804.

If a determination is made that a buffer has not been created by a victim buffer creation site, flow moves from BUFFER CREATED BY VICTIM BUFFER CREATION SITE CHECK OPERATION 804 to a BUFFER FREED BY VICTIM BUFFER CREATION SITE CHECK OPERATION 808. In BUFFER FREED BY VICTIM BUFFER CREATION SITE CHECK OPERATION 808, a determination is made as to whether a buffer has been freed by a victim buffer creation site. In one embodiment, a buffer is freed when the function that allocated the buffer on the stack returns. In another embodiment, when the buffer is allocated on the heap, the buffer is freed when the corresponding deallocation (free( ) function is called. If a buffer has not been freed by a victim buffer creation site, flow returns from BUFFER FREED BY VICTIM BUFFER CREATION SITE CHECK OPERATION 808 to BUFFER CREATED BY VICTIM BUFFER CREATION SITE CHECK OPERATION 804.

Conversely, if a buffer has been freed by a victim buffer creation site, flow moves from BUFFER FREED VICTIM BUFFER CREATION SITE CHECK OPERATION 808 to UPDATE POTENTIAL VICTIM BUFFER ADDRESS MAP OPERATION 806. In accordance with this embodiment, the potential victim buffer address map is updated by removing the characteristics of the buffer, sometimes called a potential victim buffer, freed by the victim buffer creation site. More particularly, the potential victim buffer address map includes address ranges of active potential victim buffers. Accordingly, if a potential victim buffer is freed, sometimes called deallocated, the potential victim buffer is no longer active and its corresponding entry is thus removed from the potential victim buffer address map.

Figure 10:
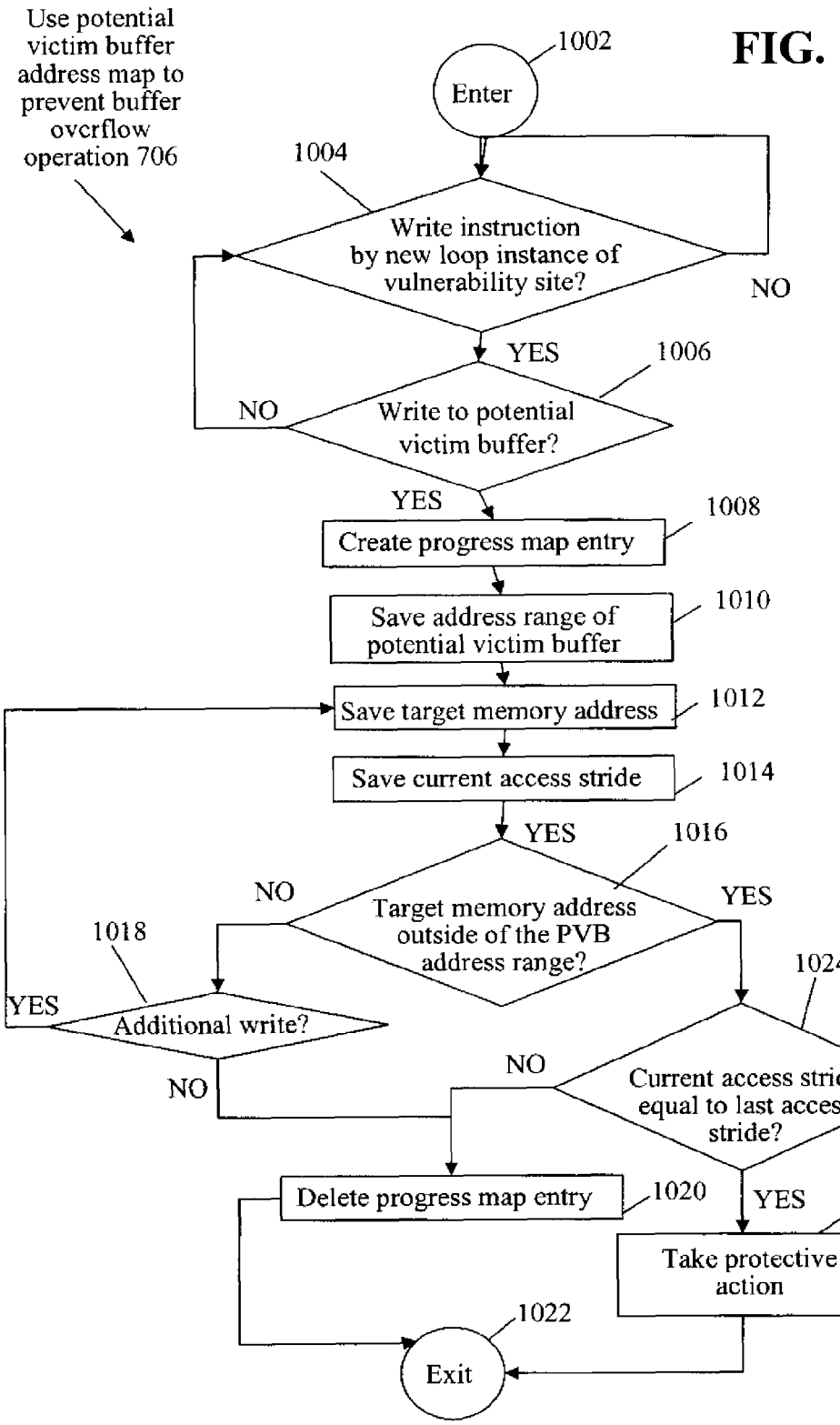
FIG. 10 is a flow diagram of a use potential victim buffer address map to prevent buffer overflow operation of the create patch operation of FIG. 7 in accordance with one embodiment.

FIG. 10 is a flow diagram of USE POTENTIAL VICTIM BUFFER ADDRESS MAP TO PREVENT BUFFER OVERFLOW OPERATION 706 of CREATE PATCH OPERATION 206 of FIG. 7 in accordance with one embodiment. Referring now to FIG. 10, from an ENTER OPERATION 1002, flow moves to a WRITE INSTRUCTION BY NEW LOOP INSTANCE OF VULNERABILITY SITE CHECK OPERATION 1004. In WRITE INSTRUCTION BY NEW LOOP INSTANCE OF VULNERABILITY SITE CHECK OPERATION 1004, a write instruction by the vulnerable program is analyzed to determine whether the write instruction corresponds to the beginning of a new loop instance of the vulnerability site.

More particularly, during execution of the vulnerable program, multiple instances of the vulnerability site may be executed. These instances can be further partitioned into multiple loop groups, each corresponding to a distinct loop instance using a difference stack context, because the vulnerability site may be called through multiple call chains. Each loop instance of the vulnerability site that attempts to modify a potential victim buffer is uniquely identified by its instruction pointer (IP) and stack pointer (SP) at that instant. In one embodiment, a call stack is maintained as the vulnerable program's control enters and exits functions.

Accordingly, the instruction pointer and stack pointer are examined to determine whether the write instruction represents the beginning of a new loop instance of the vulnerability site. If the write instruction is not the beginning of a new loop instance of the vulnerability site, flow remains at WRITE INSTRUCTION BY NEW LOOP INSTANCE OF VULNERABILITY SITE CHECK OPERATION 1004. Conversely, if the write instruction is the beginning of a new loop instance of the vulnerability site, flow moves from WRITE INSTRUCTION BY NEW LOOP INSTANCE OF VULNERABILITY SITE CHECK OPERATION 1004 to a WRITE TO POTENTIAL VICTIM BUFFER CHECK OPERATION 1006.

In WRITE TO POTENTIAL VICTIM BUFFER CHECK OPERATION 1006, a determination is made as to whether the write instruction writes to a potential victim buffer. If the write instruction writes to a buffer (sometimes called a non-victim buffer) other than a potential victim buffer, flow returns to WRITE INSTRUCTION BY NEW LOOP INSTANCE OF VULNERABILITY SITE CHECK OPERATION 1004 and no further action is taken. Accordingly, as there is no buffer overflow vulnerability in writing to a non-victim buffer, no further action is taken. Conversely, if the write instruction writes to a potential victim buffer, flow moves to a CREATE PROGRESS MAP ENTRY OPERATION 1008.

In one embodiment, the potential victim buffer address map maintained in MAINTAIN POTENTIAL VICTIM BUFFER ADDRESS MAP OPERATION 704 is used (queried) to determine whether the buffer being written to by the write instruction is a potential victim buffer or a non-victim buffer in WRITE TO POTENTIAL VICTIM BUFFER CHECK OPERATION 1006.

More particularly, the target memory address (TMA) of the write instruction is queried against the address ranges contained within the potential victim buffer address map to determine whether the target memory address falls within the address range of any entry in the potential victim buffer address map. If the target memory address does fall within an address range within the potential victim buffer address map, the write instruction is to an active potential victim buffer. Conversely, if the target memory address does not fall within any of the address ranges within the potential victim buffer address map, the write instruction is to a non-victim buffer.

In CREATE PROGRESS MAP ENTRY OPERATION 1008, a progress map entry is made in a progress map. A progress map keeps track of buffer access patterns of a loop instance of the vulnerability site. A progress map entry includes an entry in the progress map for each loop instance of the vulnerability site. Thus, each progress map entry corresponds to a unique loop instance of a vulnerability site. As set forth below, characteristics of the present loop instance of the vulnerability site in the progress map entry are updated as each instance of the vulnerability site is executed. In one embodiment, these characteristics include the instruction pointer (IP), the stack pointer (SP), the potential victim buffer address range (PVBAR), the target memory address (TMA), and the current access stride (CAS) although other characteristics are included in other embodiments.

Figure 11:
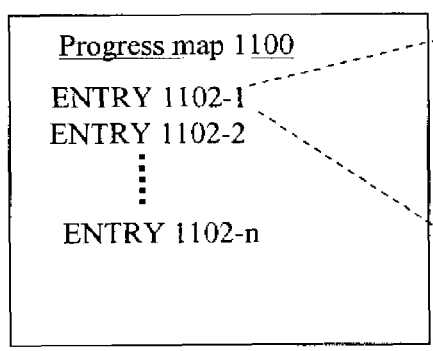
FIG. 11 is a block diagram of a progress map in accordance with one embodiment.
Figure 12:
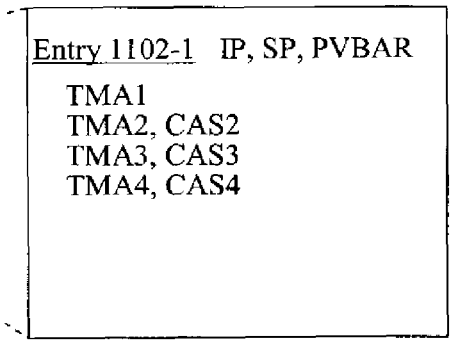
FIG. 12 is a block diagram of an entry of the progress map of FIG. 11.

FIG. 11 is a block diagram of a progress map 1100 in accordance with one embodiment. FIG. 12 is a block diagram of an entry 1102-1 of progress map 1100 of FIG. 11. Referring now to FIGS. 11 and 12 together, as illustrated, progress map 1100 includes a plurality of progress map entries 1102-1, 1102-2, ..., 1102-n, collectively progress map entries 1102. Progress map entry 1102-1 includes the instruction pointer (IP) and the stack pointer (SP) of the associated instance of the vulnerability site. The other progress map entries 1102 include the instruction pointer (IP) and the stack pointer (SP) of the associated instance of the vulnerability site in a similar manner and so are not described in detail.

From CREATE PROGRESS MAP ENTRY OPERATION 1008, flow moves to a SAVE ADDRESS RANGE OF POTENTIAL VICTIM BUFFER OPERATION 1010. In SAVE ADDRESS RANGE OF POTENTIAL VICTIM BUFFER OPERATION 1010, the address range of the potential victim buffer is saved in the progress map entry in the progress map. As set forth above, in WRITE TO POTENTIAL VICTIM BUFFER CHECK OPERATION 1006, a determination is made that the target memory address of the write instruction is within an address range of a potential victim buffer. This address range of the potential victim buffer is added to the progress map entry in the progress map.

To continue with the above illustration, the potential victim buffer address range (PVBAR) is added to entry 1102-1 in progress map 1100.

From SAVE ADDRESS RANGE OF POTENTIAL VICTIM BUFFER OPERATION 1010, flow moves to a SAVE TARGET MEMORY ADDRESS OPERATION 1012. In SAVE TARGET MEMORY ADDRESS OPERATION 1012, the target memory address of the write instruction is saved in the progress map entry in the progress map.

To continue with the above illustration, the target memory address 1 (TMA1) is added to entry 1102-1 in progress map 1100.

From SAVE TARGET MEMORY ADDRESS OPERATION 1012, flow moves to a SAVE CURRENT ACCESS STRIDE OPERATION 1014. In SAVE CURRENT ACCESS STRIDE OPERATION 1014, the current access stride is saved in the progress map entry in the progress map. The current access stride is the difference between the target memory address of one instance of the vulnerability site and the target memory address of its immediately previous instance of the vulnerability site. If there is no such previous instance, there is no current access stride. Stated another way, if the write instruction corresponds to the beginning of a new loop instance of the vulnerability site, there is no current access stride and so nothing is saved in SAVE CURRENT ACCESS STRIDE OPERATION 1014.

To continue with the above illustration, the write instruction corresponds to the beginning of a new loop instance of the vulnerability site and thus no current access stride is associated with the target memory address 1 (TMA1) in entry 1102-1 in progress map 1100.

From SAVE CURRENT ACCESS STRIDE OPERATION 1014, flow moves to a TARGET MEMORY ADDRESS OUTSIDE OF THE POTENTIAL VULNERABLE BUFFER (PVB) ADDRESS RANGE CHECK OPERATION 1016. In TARGET MEMORY ADDRESS OUTSIDE OF THE PVB ADDRESS RANGE CHECK OPERATION 1016, a determination is made as to whether the target memory address of the write instruction is outside of the address range of the potential vulnerable buffer.

If the target memory address of the write instruction is not outside, i.e., is inside, of the address range of some potential vulnerable buffer, flow moves from TARGET MEMORY ADDRESS OUTSIDE OF THE PVB ADDRESS RANGE CHECK OPERATION 1016 to an ADDITIONAL WRITE CHECK OPERATION 1018. In this event, the target memory address is confirmed to be within the address range of some potential vulnerable buffer and thus the data is being written to the potential vulnerable buffer. Stated another way, the target memory address is confirmed to be within the address range of the potential vulnerable buffer and so the potential vulnerable buffer is not being overflowed, i.e., the write is considered to be benign and thus allowed to proceed. Accordingly, no further action is taken with respect to the write instruction and flow moves to ADDITIONAL WRITE CHECK OPERATION 1018.

In ADDITIONAL WRITE CHECK OPERATION 1018, a determination is made as to whether there are additional writes that belong to the current loop instance of the vulnerability site. If there are additional writes, flow moves from ADDITIONAL WRITE CHECK OPERATION 1018 to SAVE TARGET MEMORY ADDRESS OPERATION 1012 which is performed as discussed above. Conversely, if there are no additional writes, flow moves from ADDITIONAL WRITE CHECK OPERATION 1018 to a DELETE PROGRESS MAP ENTRY OPERATION 1020.

Illustratively, the current instance of the vulnerability site is a loop that iteratively writes data. Accordingly, if the loop has ended, there will be no additional writes, and flow moves to DELETE PROGRESS MAP ENTRY OPERATION 1020. In DELETE PROGRESS MAP ENTRY OPERATION 1020, the progress map entry created in CREATE PROGRESS MAP ENTRY OPERATION 1008 is deleted. More particularly, as there are no additional writes, there is no buffer overflow vulnerability, and accordingly the associated progress map entry is deleted.

Further, in one embodiment, to garbage collect progress map entries, if a potential vulnerable buffer is freed, e.g., a YES determination in BUFFER FREED BY VICTIM BUFFER CREATION SITE CHECK OPERATION 808 of FIG. 8, the associated progress map entry(s) is deleted, sometimes called de-allocated.

From DELETE PROGRESS MAP ENTRY OPERATION 1020, flow moves to and exits at EXIT OPERATION 1022 or returns to WRITE INSTRUCTION BY NEW LOOP INSTANCE OF VULNERABILITY SITE CHECK OPERATION 1004 and awaits the next write instruction by a new loop instance of the vulnerability site.

Referring again to TARGET MEMORY ADDRESS OUTSIDE OF THE PVB ADDRESS RANGE CHECK OPERATION 1016, if a determination is made that the target memory address of the current write instruction is outside of the potential vulnerable buffer address range, flow moves to a CURRENT ACCESS STRIDE EQUAL TO THE LAST ACCESS STRIDE CHECK OPERATION 1024. In this event, a determination is made that the target memory address is outside a potential vulnerable buffer address range. Accordingly, either the write instruction is overflowing a potential vulnerable buffer, i.e., a buffer overflow is occurring, or the current loop instance of the vulnerability site has ended and a new loop instance has begun, in which case there is no buffer overflow.

To determine whether the write instruction causes a buffer overflow or not, in CURRENT ACCESS STRIDE EQUAL TO LAST ACCESS STRIDE CHECK OPERATION 1024, a determination is made as to whether the current access stride is equal to the last access stride. If the current access stride is equal to the last access stride, this means the write instruction is part of the current loop instance and a buffer overflow occurs, and flow moves from CURRENT ACCESS STRIDE EQUAL TO LAST ACCESS STRIDE CHECK OPERATION 1024 to a TAKE PROTECTIVE ACTION OPERATION 1026. In one embodiment, instead of comparing the current access stride to the last access stride, the average access stride is calculated and the current access stride is compared to the average access stride.

In TAKE PROTECTIVE ACTION OPERATION 1026, protective action is taken to prevent the buffer overflow. Illustratively, the writing of data is prevented or other protective action taken. From TAKE PROTECTIVE ACTION OPERATION 1026, flow moves to and exits at EXIT OPERATION 1022.

Conversely, if a determination is made that the current access stride does not equal the last access stride, this means that the current loop instance of the vulnerability site has ended, and flow moves to DELETE PROGRESS MAP ENTRY OPERATION 1020. In this event, the current loop instance has ended and the associated progress map entry is deleted in DELETE PROGRESS MAP ENTRY OPERATION 1020 in a manner similar to that set forth above.

Figure 13:
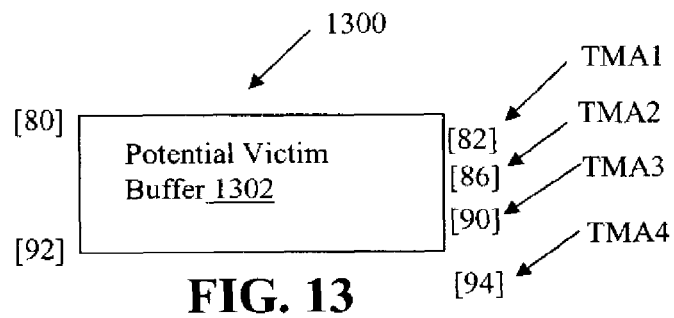
FIG. 13 is a block diagram of a memory structure in accordance with one embodiment.

To illustrate, FIG. 13 is a block diagram of a memory structure 1300 in accordance with one embodiment. Referring now to FIGS. 8, 9, 10, 11, 12 and 13 together, memory structure 1300 includes a potential victim buffer 1302 created by a victim buffer creation site. For purposes of illustration, the address range of potential victim buffer 1302 is [80]-[92] and in accordance with this example potential victim buffer 1302 is being overflowed by a vulnerability site.

More particularly, upon creation of potential victim buffer 1302, a determination is made in BUFFER CREATED BY VICTIM BUFFER CREATION SITE CHECK OPERATION 804 (FIG. 8) that a potential victim buffer 1302 has been created and potential victim buffer address map 900 (FIG. 9) is updated with the address range [80]-[92] of potential victim buffer 1302 in UPDATE POTENTIAL VICTIM BUFFER ADDRESS MAP OPERATION 806.

In WRITE INSTRUCTION BY NEW LOOP INSTANCE OF VULNERABILITY SITE CHECK OPERATION 1004, a determination is made that there is a write instruction that corresponds to a new loop instance of the vulnerability site and so flow moves to WRITE TO POTENTIAL VICTIM BUFFER CHECK OPERATION 1006. In WRITE TO POTENTIAL VICTIM BUFFER CHECK OPERATION 1006, a determination is made that there is a write to a potential victim buffer. More particularly, a determination is made as to whether the target memory address TMA1 falls within a potential victim buffer's address range in potential victim buffer address map 900. In this case, a determination is made that the target memory address TMA1 (which equals [82] in this illustration) does fall within the potential victim buffer address range (which equals [80]-[92] in this illustration) of potential victim buffer 1302.

Accordingly, entry 1102-1 is created in progress map 1100 (FIGS. 11 and 12) in CREATE PROGRESS MAP ENTRY OPERATION 1008. Address range [80]-[92] for potential victim buffer 1302 is added to entry 1102-1 as PVBAR as illustrated in SAVE ADDRESS RANGE OF POTENTIAL VICTIM BUFFER OPERATION 1010.

Continuing with the present illustration, the current target memory address TMA1 is [82]. Accordingly, [82] is saved as TMA1 in entry 1102-1 of progress map 1100 in SAVE TARGET MEMORY ADDRESS OPERATION 1012. In SAVE CURRENT ACCESS STRIDE OPERATION 1014, a determination is made that this write corresponds to the beginning of a new loop instance of the vulnerability site and so there is no current access stride. Accordingly, as illustrated in FIG. 12, there is no current access stride associated with TMA1.

In TARGET MEMORY ADDRESS OUTSIDE OF THE PVB ADDRESS RANGE CHECK OPERATION 1016, a determination is made that the target memory address TMA1 (which equals [82] in this illustration) is not outside the address range of the present loop instance's associated potential victim buffer PVBAR (which equals [80]-[92] in this illustration), i.e., [82] is contained within the range [80]-[92]. If so, the write instruction is not overflowing a buffer and flow moves to ADDITIONAL WRITE CHECK OPERATION 1018.

In ADDITIONAL WRITE CHECK OPERATION 1018, a determination is made that the present loop instance has not ended yet, and flow returns to SAVE TARGET MEMORY ADDRESS OPERATION 1012. Illustratively, the vulnerability site includes the following instructions: (1) write to target memory address (TMA); and (2) TMA equals TMA+4. The vulnerability site is included in a loop that continuously writes to and increments the target memory address.

Accordingly, the current target memory address TMA2 equals the previous target memory address TMA1+4, i.e., equals [82]+4=[86]. Accordingly, [86] is saved as TMA2 in entry 1102-1 of progress map 1100 in SAVE TARGET MEMORY ADDRESS OPERATION 1012.

In SAVE CURRENT ACCESS STRIDE OPERATION 1014, the current access stride CAS2 is saved in entry 1102-1 of progress map 1100. The current access stride CAS2 (which equals 4 in this illustration) is the difference between the target memory address of the current instance TMA2 (which equals [86] in this illustration) and the target memory address of its immediately previous instance that also belongs to the same loop instance TMA1 (which equals [82] in this illustration).

In TARGET MEMORY ADDRESS OUTSIDE OF THE PVB ADDRESS RANGE CHECK OPERATION 1016, a determination is made that the target memory address TMA2 (which equals [86] in this illustration) is not outside the address range of the present loop instance's associated potential victim buffer address range PVBAR (which equals [80]-[92] in this illustration). Accordingly, the write instruction is not overflowing a buffer and flow moves to ADDITIONAL WRITE CHECK OPERATION 1018.

In ADDITIONAL WRITE CHECK OPERATION 1018, a determination is made that the present loop instance has not ended yet, and flow returns to SAVE TARGET MEMORY ADDRESS OPERATION 1012. The current target memory address TMA3 equals the previous target memory address TMA2+4, i.e., equals [86]+4=[90]. Accordingly, [90] is saved as TMA3 in entry 1102-1 of progress map 1100 in SAVE TARGET MEMORY ADDRESS OPERATION 1012.

In SAVE CURRENT ACCESS STRIDE OPERATION 1014, the current access stride CAS3 is saved in entry 1102-1 of progress map 1100. The current access stride CAS3 (which equals 4 in this illustration) is the difference between the target memory address of the current instance TMA3 (which equals [90] in this illustration) and the target memory address of its immediately previous instance that also belongs to the same loop instance TMA2 (which equals [86] in this illustration).

In TARGET MEMORY ADDRESS OUTSIDE OF THE PVB ADDRESS RANGE CHECK OPERATION 1016, a determination is made that the target memory address TMA3 (which equals [90] in this illustration) is not outside the potential victim buffer address range PVBAR (which equals [80]-[92] in this illustration). Accordingly, the write instruction is not overflowing a buffer and flow moves to ADDITIONAL WRITE CHECK OPERATION 1018.

In ADDITIONAL WRITE CHECK OPERATION 1018, a determination is made that the present loop instance has not ended yet, and flow returns to SAVE TARGET MEMORY ADDRESS OPERATION 1012. The current target memory address TMA4 equals the previous target memory address TMA3+4, i.e., equals [90]+4=[94]. Accordingly, [94] is saved as TMA4 in entry 1102-1 of progress map 1100 in SAVE TARGET MEMORY ADDRESS OPERATION 1012.

In SAVE CURRENT ACCESS STRIDE OPERATION 1014, the current access stride CAS4 is saved in entry 1102-1 of progress map 1100. The current access stride CAS4 (which equals 4 in this illustration) is the difference between the target memory address of the current instance TMA4 (which equals [94] in this illustration) and the target memory address of its immediately previous instance that also belongs to the same loop instance TMA3 (which equals [90] in this illustration).

In TARGET MEMORY ADDRESS OUTSIDE OF THE PVB ADDRESS RANGE CHECK OPERATION 1016, a determination is made that the target memory address TMA4 (which equals [94] in this illustration) is outside the potential victim buffer address range PVBAR (which equals [80]-[92] in this illustration). Accordingly, flow moves to CURRENT ACCESS STRIDE EQUAL TO LAST ACCESS STRIDE CHECK OPERATION 1024.

In CURRENT ACCESS STRIDE EQUAL TO LAST ACCESS STRIDE CHECK OPERATION 1024, a determination is made that the current access stride CAS4 (which equals 4 in this illustration) does equal of the last access stride CAS3 (which also equals 4 in this illustration). Accordingly, potential victim buffer 1302 is being overflowed by the vulnerability site due to execution of looped instructions and so flow moves to TAKE PROTECTIVE ACTION OPERATION 1026. In TAKE PROTECTIVE ACTION OPERATION 1026, protective action is taken, e.g., writing to TMA4 which is outside of potential victim buffer 1302 is prevented. In this manner, the buffer overflow attack is defeated.

Figure 14:
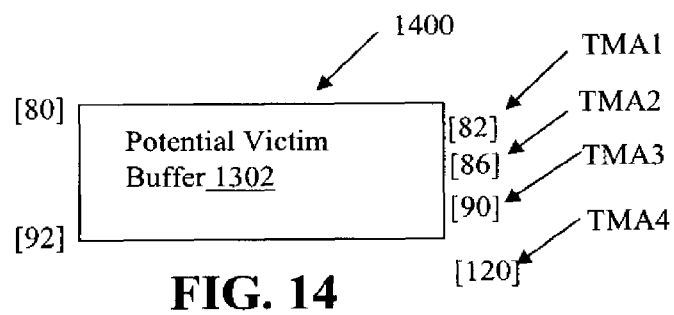
FIG. 14 is a block diagram of a memory structure in accordance with another embodiment.

FIG. 14 is a block diagram of a memory structure 1400 in accordance with another embodiment. Memory structure 1400 is substantially similar to memory structure 1300 but illustrates the example of the end of a loop of execution in contrast to a buffer overflow. Referring now to FIGS. 8, 9, 10, 11, 12 and 14 together, memory structure 1400 includes potential victim buffer 1302 having the address range [80]-[92] as set forth above. PVBAR ([80]-[92]), TMA1 ([82]), TMA2 ([86]), CAS2 (4), TMA3 ([90]), CAS3 (4) are added to entry 1102-1 of progress map 1100 in a manner similar to that described above regarding memory structure 1300 as so is not repeated here.

In ADDITIONAL WRITE CHECK OPERATION 1018, a determination is made that the present loop instance has not ended yet, and flow returns to SAVE TARGET MEMORY ADDRESS OPERATION 1012. The current target memory address TMA4 is [120] in accordance with the illustration of FIG. 14. For example, a new loop at the vulnerability site is being executed. Accordingly, [120] is saved as TMA4 in entry 1102-1 of progress map 1100 in SAVE TARGET MEMORY ADDRESS OPERATION 1012.

In SAVE CURRENT ACCESS STRIDE OPERATION 1014, the current access stride CAS4 is saved in entry 1102-1 of progress map 1100. The current access stride CAS4 (which equals 30 in this illustration) is the difference between the target memory address of the current instance TMA4 (which equals [120] in this illustration) and the previous target memory address TMA3 (which equals [90] in this illustration).

In TARGET MEMORY ADDRESS OUTSIDE OF THE POTENTIAL VICTIM BUFFER ADDRESS RANGE CHECK OPERATION 1016, a determination is made that the target memory address TMA4 (which equals [120] in this illustration) is outside the potential victim buffer address range PVBAR (which equals [80]-[92] in this illustration). Accordingly, flow moves to CURRENT ACCESS STRIDE EQUAL TO LAST ACCESS STRIDE CHECK OPERATION 1024.

In CURRENT ACCESS STRIDE EQUAL TO LAST ACCESS STRIDE CHECK OPERATION 1024, a determination is made that the current access stride CAS4 (which equals 30 in this illustration) does not equal the last access stride CAS3 (which equals 4 in this illustration). Accordingly, potential victim buffer 1302 is not being overflowed by the vulnerability site but a new loop of instructions are being executed at the vulnerability site. Thus, flow moves to DELETE PROGRESS MAP ENTRY OPERATION 1020 and entry 1102-1 is deleted from progress map 1100.

In the above manner, using the progress map, looped or iterated access to a potential victim buffer is detected without extracting the loop context of the vulnerability site, which could require sophisticated binary analysis because a loop's body can contain calls to arbitrarily complex functions. Further, an automatic method to derive a patch that accurately seals the vulnerability exploited by an attack is presented that greatly reduces the false positive and negative rate and shortens the response time to new threats.

Referring again to FIG. 1, buffer overflow vulnerability detection and patch generation application 106 is in computer memory 114. As used herein, a computer memory refers to a volatile memory, a non-volatile memory, or a combination of the two.

Although buffer overflow vulnerability detection and patch generation application 106 is referred to as an application, this is illustrative only. Buffer overflow vulnerability detection and patch generation application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a tangible storage medium configured to store or transport computer readable code in accordance with an embodiment. Some examples of computer program products are CD-ROM discs, DVDs, ROM cards, floppy discs, magnetic tapes, computer hard drives, and servers on a network.

As illustrated in FIG. 1, this medium may belong to the computer system itself. However, the medium also may be removed from the computer system. For example, buffer overflow vulnerability detection and patch generation application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the buffer overflow vulnerability detection and patch generation functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the buffer overflow vulnerability detection and patch generation functionality in accordance with one embodiment can be implemented in a wide variety of computer system configurations. In addition, the buffer overflow vulnerability detection and patch generation functionality could be stored as different modules in memories of different devices. For example, buffer overflow vulnerability detection and patch generation application 106 could initially be stored in server system 130, and then as necessary, a portion of buffer overflow vulnerability detection and patch generation application 106 could be transferred to host computer system 102 and executed on host computer system 102. Consequently, part of the buffer overflow vulnerability detection and patch generation functionality would be executed on processor 134 of server system 130, and another part would be executed on processor 108 of host computer system 102. In view of this disclosure, those of skill in the art can implement various embodiments in a wide-variety of physical hardware configurations using an operating system and computer programming language of interest to the user.

In yet another embodiment, buffer overflow vulnerability detection and patch generation application 106 is stored in memory 136 of server system 130. Buffer overflow vulnerability detection and patch generation application 106 is transferred over network 124 to memory 114 in host computer system 102. In this embodiment, network interface 138 and I/O interface 110 would include analog modems, digital modems, or a network interface card. If modems are used, network 124 includes a communications network, and buffer overflow vulnerability detection and patch generation application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
   identifying a buffer overflow vulnerability in a vulnerable program comprising:
      identifying a victim buffer creation site that created a victim buffer; and
      identifying a vulnerability site that overflowed said victim buffer; and
   creating a patch for said vulnerable program to prevent said vulnerability site from overflowing a potential victim buffer created by said victim buffer creation site comprising:
      maintaining a potential victim buffer address map comprising said potential victim buffer;
      using said potential victim buffer address map to determine whether a buffer being written to by a write instruction is said potential victim buffer;
      creating a progress map entry in a progress map upon a determination that said buffer being written to by said write instruction is said potential victim buffer;
      saving an address range of said potential victim buffer in said progress map entry;
      saving a target memory address of said write instruction in said progress map entry;
      saving a current access stride in said progress map entry;
      determining that said target memory address is outside of said address range of said potential victim buffer; and
      determining whether said current access stride is equal to a last access stride.

2. The computer-implemented method of claim 1 wherein said identifying a buffer overflow vulnerability in a vulnerable program further comprises emulating an instruction of said vulnerable program.

3. The computer-implemented method of claim 2 wherein said identifying a buffer overflow vulnerability in a vulnerable program further comprises determining whether a buffer is allocated during said emulating an instruction.

4. The computer-implemented method of claim 2 wherein, upon a determination that a buffer is allocated during said emulating an instruction, said identifying a buffer overflow vulnerability in a vulnerable program further comprising updating an allocated buffer versus instruction map with said buffer and said instruction that allocated said buffer.

5. The computer-implemented method of claim 4 wherein said identifying a victim buffer creation site that created a victim buffer is performed using said allocated buffer versus instruction map.

6. The computer-implemented method of claim 2 wherein said identifying a buffer overflow vulnerability in a vulnerable program further comprises determining whether a memory location is modified during said emulating an instruction.

7. The computer-implemented method of claim 6 wherein, upon a determination that a memory location is modified during said emulating an instruction, said identifying a buffer overflow vulnerability in a vulnerable program further comprises updating a modified memory locations versus modifying instructions map with said modified memory location and said instruction that modified said memory location.

8. The computer-implemented method of claim 7 wherein said identifying a vulnerability site that overflowed said victim buffer is performed using said modified memory locations versus modifying instructions map.

9. The computer-implemented method of claim 2 wherein said identifying a buffer overflow vulnerability in a vulnerable program further comprises determining whether said instruction is a return.

10. The computer-implemented method of claim 9 wherein, upon a determination that said instruction is a return, said identifying a buffer overflow vulnerability in a vulnerable program further comprising determining whether a control sensitive data structure (CSDS) is corrupted.

11. The computer-implemented method of claim 10, wherein upon a determination that said CSDS is corrupted, said identifying a buffer overflow vulnerability in a vulnerable program comprising said identifying a victim buffer creation site that created a victim buffer and said identifying a vulnerability site that overflow said victim buffer.

12. The computer-implemented method of claim 11 wherein said identifying a buffer overflow vulnerability in a vulnerable program further comprises identifying said victim buffer.

13. The computer-implemented method of claim 1 wherein said identifying a buffer overflow vulnerability in a vulnerable program comprises running an exploit against said vulnerable program in an emulated environment.

14. The computer-implemented method of claim 1 wherein upon a determination that said current access stride is equal to said last access stride, said creating a patch for said vulnerable program further comprises taking protective action.

15. A computer system comprising:
   a memory having stored therein a buffer overflow vulnerability detection and patch generation application; and
   a processor coupled to said memory, wherein execution of said buffer overflow vulnerability detection and patch generation application generates a method comprising:
      identifying a buffer overflow vulnerability in a vulnerable program comprising:
         identifying a victim buffer creation site that created a victim buffer; and
         identifying a vulnerability site that overflowed said victim buffer; and
      creating a patch for said vulnerable program to prevent said vulnerability site from overflowing a potential victim buffer created by said victim buffer creation site comprising:
   maintaining a potential victim buffer address map comprising said potential victim buffer;
   using said potential victim buffer address map to determine whether a buffer being written to by a write instruction is said potential victim buffer;
   creating a progress map entry in a progress map upon a determination that said buffer being written to by said write instruction is said potential victim buffer;
   saving an address range of said potential victim buffer in said progress map entry;
   saving a target memory address of said write instruction in said progress map entry;
   saving a current access stride in said progress map entry;
   determining that said target memory address is outside of said address range of said potential victim buffer; and
   determining whether said current access stride is equal to a last access stride.

16. A computer-program product comprising a tangible computer readable non-transitory storage medium containing computer program code comprising:
   a buffer overflow vulnerability detection and patch generation application for identifying a buffer overflow vulnerability in a vulnerable program comprising:
      identifying a victim buffer creation site that created a victim buffer; and
      identifying a vulnerability site that overflowed said victim buffer; and
   said buffer overflow vulnerability detection and patch generation application further for creating a patch for said vulnerable program to prevent said vulnerability site from overflowing a potential victim buffer created by said victim buffer creation site comprising:
   maintaining a potential victim buffer address map comprising said potential victim buffer;
   using said potential victim buffer address map to determine whether a buffer being written to by a write instruction is said potential victim buffer;
   creating a progress map entry in a progress map upon a determination that said buffer being written to by said write instruction is said potential victim buffer;
   saving an address range of said potential victim buffer in said progress map entry;
   saving a target memory address of said write instruction in said progress map entry;
   saving a current access stride in said progress map entry;
   determining that said target memory address is outside of said address range of said potential victim buffer; and
   determining whether said current access stride is equal to a last access stride.

* * * * *